Patented Apr. 20, 1954

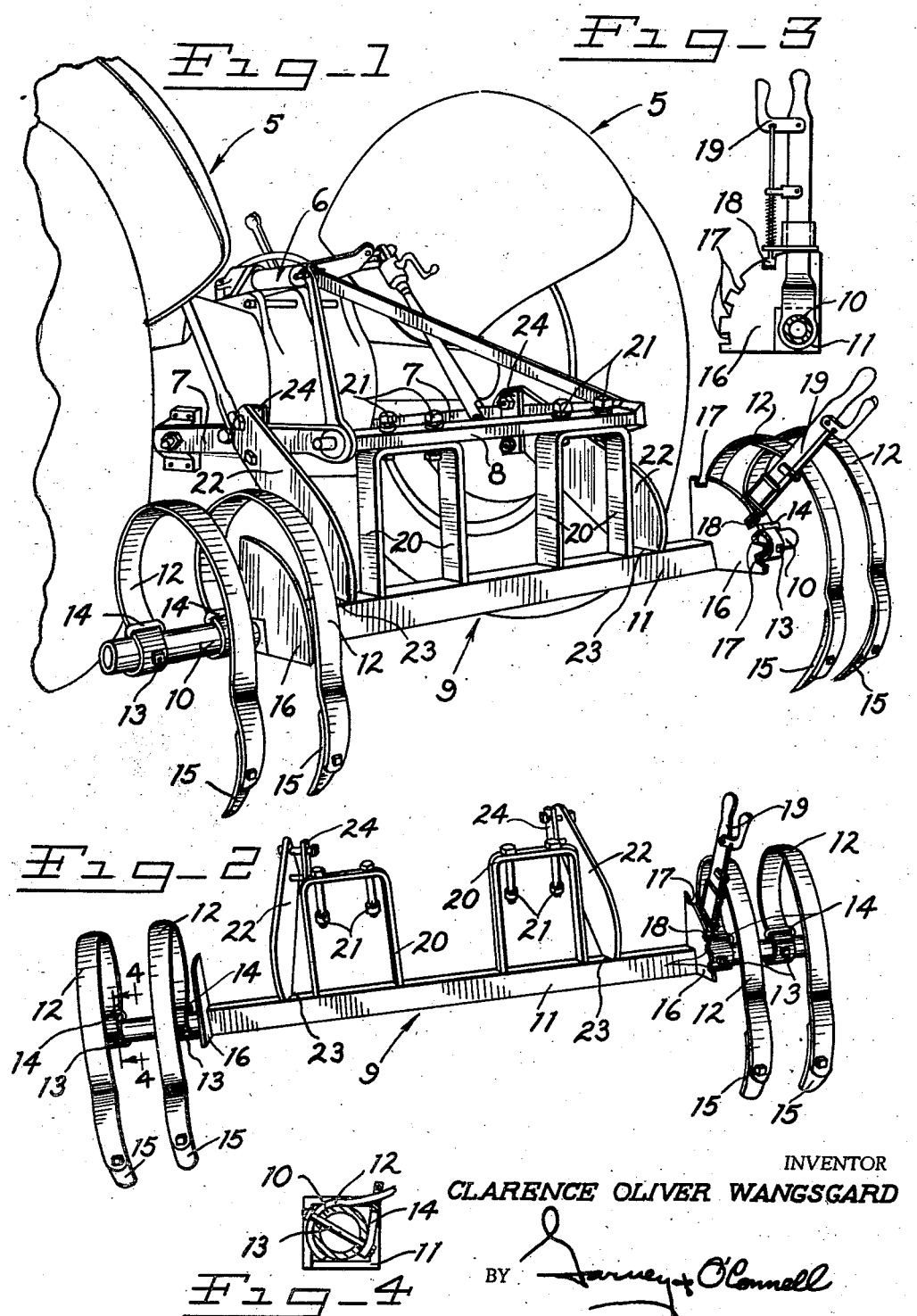

2,675,752

UNITED STATES PATENT OFFICE 2,675,752

GROUND PULVERIZER FOR ERADICATING
THE TRACKS OF DRAFT VEHICLES

Clarence Oliver Wangsgard, Ogden, Utah

Application August 7, 1950, Serial No. 178,114

2 Claims. (Cl. 97—47.44)

The present invention relates generally to a ground pulverizer for eradicating the tracks of draft vehicles and more particularly to a pulverizer adapted to be detachably engageable with the vehicle.

In farming operations, proper seeding of a field demands that the field be worked into a uniformly loose and level condition. One factor preventing this desired condition is the tracks made by the traction elements of vehicles used in working the field, which tracks leave the field in a ridged condition. Consequently, in these tracked down areas, the seed is very often not planted deep enough, thereby producing poor germination. Also, in fields where irrigation is employed, the earth on each side of the track will fall away and sink lower than the hard packed surface, leaving the field ridged.

It is therefore the principal object of the present invention to provide, in conjunction with a draft vehicle, a ground pulverizer which will eradicate the tracks made by the vehicle and loosen and level earth which has been packed down by the traction elements.

In carrying out the objects of this invention, I have found it expedient to position the pulverizer immediately behind the draft vehicle so that each pulverizing member is very close to and in direct alignment with each traction element. This proximity of pulverizer and vehicle permits a seeder or other machine to be positioned close to the tractor yet aft of the pulverizer. The pulverizer of this invention includes a plow assembly of resilient material to avoid damage to the plow members if contact is made with objects such as rocks, the plow members being adjustable to control the depth of plowing.

Other objects of the invention will be apparent from the following description of the presently preferred form of the invention taken in conjunction with the accompanying drawings, wherein:

Figure 1 is a perspective view of the pulverizer of the present invention in operative engagement with a tractor;

Figure 2 is a perspective view of the pulverizer per se;

Figure 3 is a vertical sectional view through the rack shaft and angle frame showing the plow adjusting mechanism in side elevation; and Figure 4 is a sectional view taken on the line 4—4 of Figure 2, looking in the direction of the arrows, showing the manner of securing a plow assembly.

Referring now in greater detail to the drawings, for purposes of illustration, in Figure 1, I have shown the device of the present invention attached to a tractor 5 which has the conventional hydraulic lift 6, embodying lifting arms 7 to which is secured a hitch 8.

Mounted on the hitch 8 of the tractor is the pulverizer, generally designated 9. The pulverizer 9 comprises a rock shaft 10 cradled in an angle iron frame 11. A plow assembly is secured to each end of rock shaft 10, each plow assembly comprising a pair of bowed springs 12, one end of each spring being secured to the shaft by a nut and bolt 13 and bracket plate 14, as shown to advantage in Figure 4. Secured to the other extremity of each spring, in any suitable manner, is a plow member 15. The inherent resiliency of the springs 12 prevents fracture of the members 15 if contact is made with objects in the ground.

Mounted on each extremity of the frame 11 and adjacent each pair of springs 12 is a sector plate 16 to limit longitudinal displacement of the rock shaft 10.

As best shown in Figure 3, one of the sector plates 16 is notched as indicated at 17 to receive a detent 18 of a hand lever mechanism 19 which is rigidly secured to the shaft 10. Arcuate movement of the hand lever mechanism 19 causes rotation of the shaft 10 with consequent raising and lowering of the plow members 15 to attain the desired depth of plowing.

The pulverizer 9 is detachably connected to the hitch 8 of the tractor 5 by a pair of inverted U-shaped bars 20 secured by nuts and bolts 21 to hitch 8. The free ends of the U-shaped bars 20 are welded or secured in any other suitable manner to the angle iron 11. To prevent skewing of the pulverizer when it is in motion, braces 22, secured to angle iron 11 at 23, are positioned adjacent U-shaped bars 20, and anchored to lifting arms 7 of hydraulic lift 6 by clamp means 24. The frame 11 is maintained stationary.

In operation, when the pulverizer is engaged with a tractor, as shown in Figure 1, adjustment of the plow members 15 may be made by hand lever mechanism 19. The degree of adjustment depends upon the nature and condition of the earth. As the pulverizer is drawn by the tractor, each pair of plow members 15 loosens the hard-packed depressions made by the traction elements of the vehicle. In the event of contact with an object in the ground, the plow assembly yields sufficiently to avoid damage to the plow members. When it is desired to disengage the pulverizer and vehicle, nuts and bolts 21 and clamp means 24 are removed.

While a preferred embodiment of the device of the present invention has been described, such has been done for purposes of illustration, and various changes may be made therein which come within the scope of the claims herein appended.

What I claim is:

1. A ground pulverizer for application to a tractor having the conventional hydraulic lift which includes a transverse hitch bar and pivotally mounted rearwardly extending lifting arms terminally connected with said hitch bar, the same comprising a transverse cross-sectionally angular frame of a length just short of the width of the tread of the tractor, inverted U-shaped hanger bars having their legs united with the frame and their transverse portions disposed against the underside of the hitch bar, removable fasteners securing the hangers to the hitch bar, an axle journalled in the frame, pulverizing plow members mounted on opposite ends of the axle and positioned directly behind the wheels of the tractor, a sector mounted at one end of the frame and formed with peripheral notches, a hand lever secured to said shaft, and a manually operable detent mounted on said lever and engageable with said notches to effect limited turning movement of said shaft and therefore changing the positions of said pulverizing plow members with respect to said housing.

2. A ground pulverizer for application to a tractor having the conventional hydraulic lift which includes a transverse hitch bar and pivotally mounted rearwardly extending lifting arms terminally connected with said hitch bar, the same comprising a transverse cross-sectionally angular frame of a length just short of the width of the tread of the tractor, inverted U-shaped hanger bars having their legs united with the frame and their transverse portions disposed against the underside of the hitch bar, removable fasteners securing the hangers to the hitch bar, an axle journalled in the frame, pulverizing plow members mounted on opposite ends of the axle and positioned directly behind the wheels of the tractor, a sector mounted at one end of the frame and formed with peripheral notches, a hand lever secured to said shaft, a manually operable detent mounted on said lever and engageable with said notches to effect limited turning movement of said shaft and therefore changing the positions of said pulverizing plow members with respect to said housing, and braces terminally united with said housing adjacent said U-shaped hangers and provided at their remote ends with clamps engageable with the aforesaid lifting bars.

References Cited in the file of this patent

UNITED STATES PATENTS

| Number | Name | Date |
|---|---|---|
| 837,986 | Walker | Dec. 11, 1906 |
| 1,332,643 | Thomas | Mar. 2, 1920 |
| 1,358,650 | Pendleton | Nov. 9, 1920 |
| 1,535,439 | Ronning et al. | Apr. 28, 1925 |
| 1,871,097 | Trigwell et al. | Aug. 9, 1932 |
| 1,917,944 | Langdon | July 11, 1933 |
| 2,333,586 | Rude | Nov. 2, 1943 |
| 2,392,903 | Currie | Jan. 15, 1946 |
| 2,561,650 | Carlson | July 24, 1951 |